(12) United States Patent
Braghiroli (10) Patent No.: US 10,135,389 B2
(45) Date of Patent: Nov. 20, 2018

(54) PHOTOVOLTAIC SLEEVE FOR STREET LIGHTS AND THE LIKE

(71) Applicant: Marco Braghiroli, London (GB)

(72) Inventor: Marco Braghiroli, London (GB)

( * ) Notice: Subject to any disclaimer, the term of this patent is extended or adjusted under 35 U.S.C. 154(b) by 0 days.

(21) Appl. No.: 14/367,860

(22) PCT Filed: Dec. 24, 2012

(86) PCT No.: PCT/GB2012/000923
§ 371 (c)(1),
(2) Date: Jun. 20, 2014

(87) PCT Pub. No.: WO2013/093402
PCT Pub. Date: Jun. 27, 2013

(65) Prior Publication Data
US 2014/0360559 A1    Dec. 11, 2014

(30) Foreign Application Priority Data
Dec. 23, 2011    (GB) .................................. 1122239.5

(51) Int. Cl.
*H02S 30/10* (2014.01)
*F21S 9/03* (2006.01)
(Continued)

(52) U.S. Cl.
CPC .............. *H02S 30/10* (2014.12); *F21S 8/086* (2013.01); *F21S 9/035* (2013.01); *H02S 20/20* (2014.12);
(Continued)

(58) Field of Classification Search
CPC ........... F21S 9/035; F21S 8/086; Y02B 20/72; H02S 30/10; H02S 20/20; F24J 2/523; F24J 2/5243
(Continued)

(56) References Cited

U.S. PATENT DOCUMENTS

| 875,019 A | 12/1907 | Wahlert |
| 1,427,344 A * | 8/1922 | Barclay .................. F21S 13/10 362/434 |

(Continued)

FOREIGN PATENT DOCUMENTS

| CN | 2011845324 Y | 1/2009 |
| EP | 0849524 A2 | 6/1998 |

(Continued)

OTHER PUBLICATIONS

Machine Translation of JP 2000-277782.*

*Primary Examiner* — Liesl C Baumann
(74) *Attorney, Agent, or Firm* — AEON Law, PLLC; Adam L. K. Philipp; Jonathan E. Olson (57) ABSTRACT

A photovoltaic panel system for assembly to an outdoor column which is ergonomic in design, modular in structure and has features of connection that are protected from the outdoor elements. The assembly comprises one or more housings, each housing comprising a photovoltaic panel extending between two collars and each collar being hinged to allow the collars to be placed around the column. The also includes an extension section extending beyond one collar at one end of the housing, and which has means to secure the section to the column and having a dimension of less than each collar. The collar of one housing extends over the extension piece of the neighboring housing to cover the column securement means and protect the securement means from the outside environment.

10 Claims, 9 Drawing Sheets (51) Int. Cl.
*F21S 8/08* (2006.01)
*H02S 20/20* (2014.01)
*F24J 2/52* (2006.01)

(52) U.S. Cl.
CPC .............. *F24J 2/523* (2013.01); *F24J 2/5243* (2013.01); *Y02B 20/72* (2013.01)

(58) Field of Classification Search
USPC .................................................. 136/243–265
See application file for complete search history.

(56) References Cited

U.S. PATENT DOCUMENTS

| | | | | |
|---|---|---|---|---|
| 3,341,718 | A * | 9/1967 | Acker ..................... | F21S 8/088 174/38 |
| 4,224,082 | A * | 9/1980 | Jacobson ................ | F03D 9/007 126/646 |
| 4,257,396 | A | 3/1981 | Reinert | |
| 4,878,160 | A * | 10/1989 | Reneau ................. | E04H 12/003 362/269 |
| 6,060,658 | A * | 5/2000 | Yoshida .................. | F21S 8/086 136/243 |
| 6,346,669 | B1 * | 2/2002 | Itoh ........................ | F24J 2/5235 136/244 |
| 6,942,361 | B1 * | 9/2005 | Kishimura .............. | F21S 8/086 362/240 |
| 2005/0152125 | A1 * | 7/2005 | Fukuda .................. | H05B 33/04 362/84 |
| 2006/0180729 | A1 * | 8/2006 | Yang ................... | E04H 12/2215 248/508 |
| 2006/0198084 | A1 * | 9/2006 | Hall, Jr. ................. | H05B 3/008 361/600 |
| 2007/0058363 | A1 | 3/2007 | Copeland et al. | |
| 2007/0199589 | A1 * | 8/2007 | Corbero Fornt ........ | F21S 9/037 136/244 |
| 2008/0137327 | A1 | 6/2008 | Hodulik | |
| 2009/0040750 | A1 * | 2/2009 | Myer ...................... | F21S 8/083 362/183 |
| 2009/0211621 | A1 | 8/2009 | LeBlanc | |
| 2010/0029268 | A1 | 2/2010 | Myer | |
| 2010/0195319 | A1 | 8/2010 | Norniella Carreno | |
| 2011/0017262 | A1 | 1/2011 | Oppizzi | |
| 2011/0036391 | A1 * | 2/2011 | McCormick ........ | G02F 1/13439 136/252 |
| 2011/0273883 | A1 * | 11/2011 | Tsai ........................ | F21V 15/01 362/249.02 |
| 2011/0305010 | A1 * | 12/2011 | Leadford ................ | F21S 9/035 362/183 |
| 2012/0113625 | A1 * | 5/2012 | Werner ..................... | F21L 4/08 362/183 |
| 2013/0000632 | A1 * | 1/2013 | Lundahl ................. | H02S 20/00 126/574 |
| 2013/0322063 | A1 * | 12/2013 | Tittle ................... | H01L 31/0422 362/183 |

FOREIGN PATENT DOCUMENTS

| | | |
|---|---|---|
| EP | 1816325 A1 | 8/2007 |
| EP | 2282108 A | 2/2011 |
| GB | 2408395 A | 5/2005 |
| GB | 2464288 A | 4/2010 |
| JP | H10184101 A * | 7/1998 |
| JP | 2000277782 A * | 10/2000 |
| JP | 2012150967 A | 8/2012 |
| KR | 20100116899 A | 2/2010 |
| WO | 08125711 A1 | 10/2008 |
| WO | 2010050993 A | 5/2010 |
| WO | 2011013063 A | 2/2011 |

* cited by examiner

PHOTOVOLTAIC SLEEVE FOR STREET LIGHTS AND THE LIKE

FIELD OF INVENTION

The present invention relates to a photovoltaic sleeve for outdoor street lights and the like. More especially the invention relates to a photovoltaic sleeve that can be retrofitted to existing outdoor columns for devices requiring power, such as, for example but without limitation, street lights, cameras and CCTVs as well as other signage and devices such as traffic lights. The invention would also be applicable to wind turbines and similar devices.

BACKGROUND TO THE INVENTION

There is a forever increasing demand for outdoor "street furniture" such as street lamps, cameras and closed circuit television cameras on today's streets. All such street furniture requires power to run. The devices generally sit at the top of large columns that are linked under the ground to the national grid.

There are a number of systems known that allow assembly of solar or photovoltaic panels to the columns of existing street furniture to provide supplemental power to run the device.

US 2010029268A, for example, discloses a retrofit system comprising the integration of a solar collector to a street lamp.

WO10050993A discloses a solar-powered lighting system that includes a flexible panel of photovoltaic laminate applied to the outside surface of a light pole.

US2009211621A discloses a flexible magnetically attached solar electric collector sheet system that comprises a thin film that wraps around the column of the street furniture.

WO11013063A discloses a photovoltaic generator mountable on a street light pole.

The present invention aims to provide an improved photovoltaic panel system for assembly to an outdoor column which is ergonomic in design, modular in structure and has features of connection that are protected from the outdoor elements.

The design of the present invention is intended to be discrete and empathetic to urban surroundings while also meeting the necessary criteria for safety and robustness.

The modular nature of the design allows for system to be retrofitted to columns of any length.

The connection mechanism allows for the system to be retrofitted to columns of different, or uneven, width.

The abutment of each panel section of the assembly is such as to protect the connecting mechanism from the outdoor elements.

STATEMENT OF INVENTION

According to a first aspect of the invention there is provided a photovoltaic panel assembly for connection around a column carrying a device requiring power, the assembly comprising one or more housings, each housing comprising a photovoltaic panel extending between two collars, each collar being hinged to allow the collars to be placed around the column, the housing further comprising an extension section extending beyond one collar at one end of the housing, the extension section having means to secure the section to the column and having a dimension of less than each collar, such that during assembly of two or more housings, the collar of one housing extends over the extension piece of the neighbouring housing, to thereby cover the column securement means to thereby protect the securement means from the outside environment.

The photovoltaic panel may be flexible. Alternatively the panel may be rigid in structure.

Preferably the assembly further comprises a support structure which, in use, extends upwardly from the ground and supports the or each housing.

Preferably the support structure is made from stainless steel and includes a steel base.

Preferably the support structure comprises two arcuate sections connected along one edge by hinges.

Preferably the support structure includes a housing for a rechargeable battery.

Preferably the assembly includes an internal insert made from synthetic rubber that is shaped to profile the column to which the assembly is retrofitted.

Preferably the support structure supports two or more housings which are connected one above each other.

Preferably, the assembly includes a cap that fits over the extension plate of the top-most housing.

BRIEF DESCRIPTION OF THE DRAWINGS

One embodiment of the invention will now be described by way of example only, with reference to the accompanying figures in which.

DETAILED DESCRIPTION OF PREFERRED EMBODIMENTS

Figure 1:
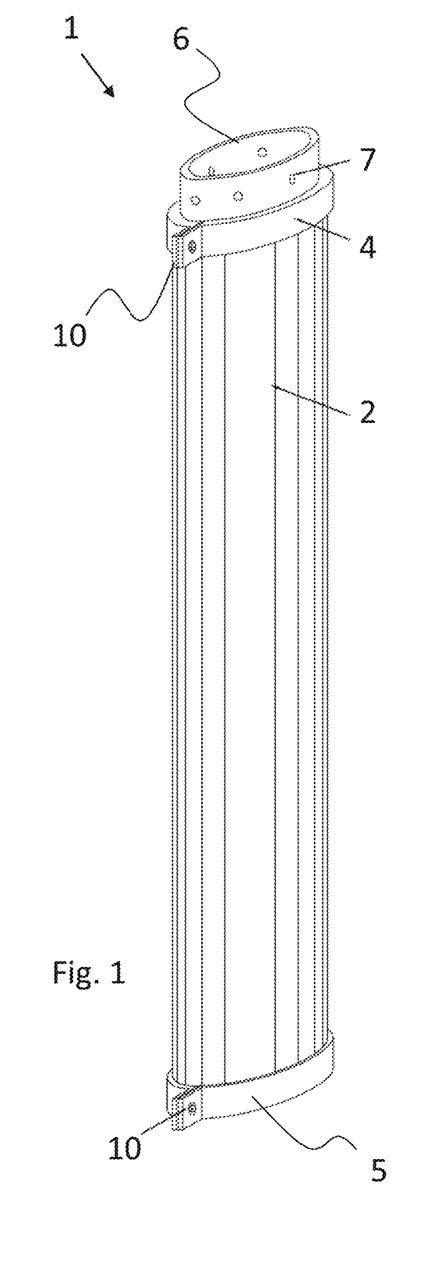
FIG. 1 is a perspective view of a photovoltaic housing constructed in accordance with a first embodiment of the invention.

Referring first to FIG. 1, a photovoltaic panel assembly for retrofitting to an outdoor column, such as one carrying a street light comprises at least one housing section 1 which includes a photovoltaic panel 2 made from a plurality of photovoltaic cells 3 extending between upper and lower securing collars 4, 5.

The photovoltaic panel is preferably flexible. Alternatively the panel may have a rigid or substantially rigid structure.

Figure 2:
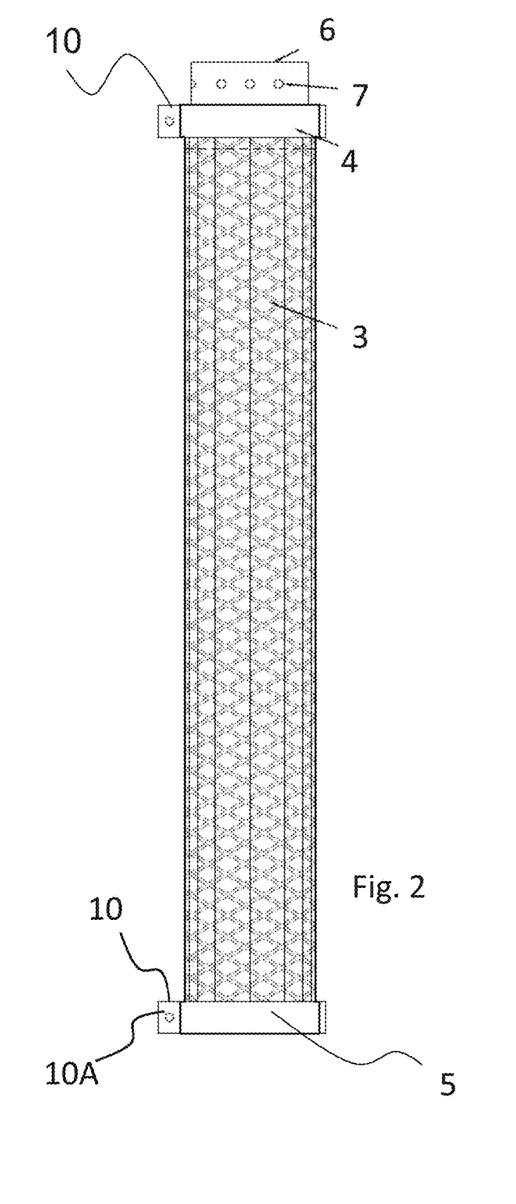
FIG. 2 is a side view of the housing of FIG. 1.

The housing 1 further includes a tubular extension plate 6 extending beyond the upper collar 4. The extension plate 6 has a plurality of apertures 7 to receive screws or other standard fasteners (not shown) to secure the plate 6 to the surface of the column to which the apparatus of the assembly is to be fitted.

The extension plate 6 dimensions that are less than the collars 4, 5. In other words, the extension plate has a smaller diameter than the collars 4, 5 (when closed around the column) such that, during assembly, the lower collar 5 of one housing 1 fits over the extension plate 6 extending upwardly from the housing beneath. This means that the screws or other fixing members fixing the extension plate 6 to the column are shielded by the collar 5 of the housing above such that they are not exposed to the outside environment which may otherwise cause them the degrade and eventually fail or need replacement.

Figure 3:
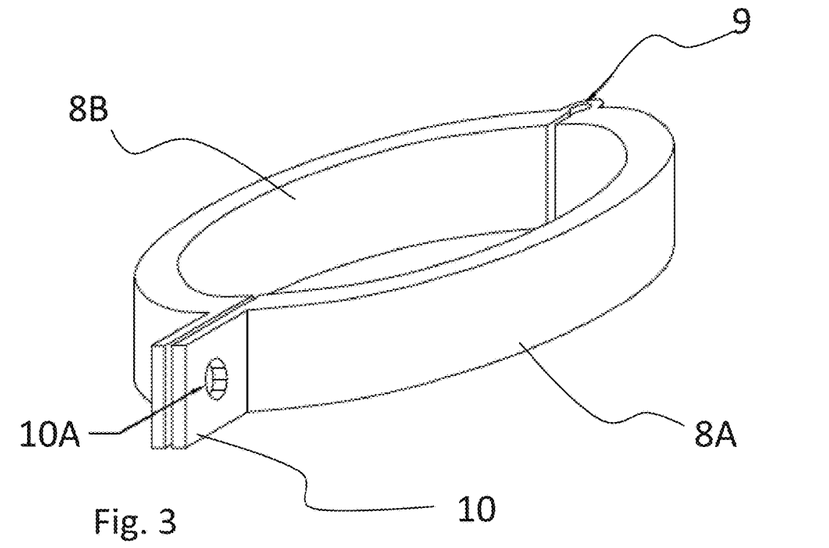
FIG. 3 is a perspective view of a collar of the housing of FIGS. 1 and 2.

The collar 4, 5 is shown in FIG. 3. The collar 4, 5 is typically made from stainless steel or similar material and comprises two arcuate sections 8A, 8B, connected together at one end via a hinge 9. The ends distal to the hinge 8 include outwardly projecting flanges 10 each having an aperture 10A through which a clamping bolt can extend to clamp the collar 4, 5 around the column.

The clamping mechanism may include a ratchet mechanism or similar which can vary the strength of the grip around the column.

Figures 5, 6:
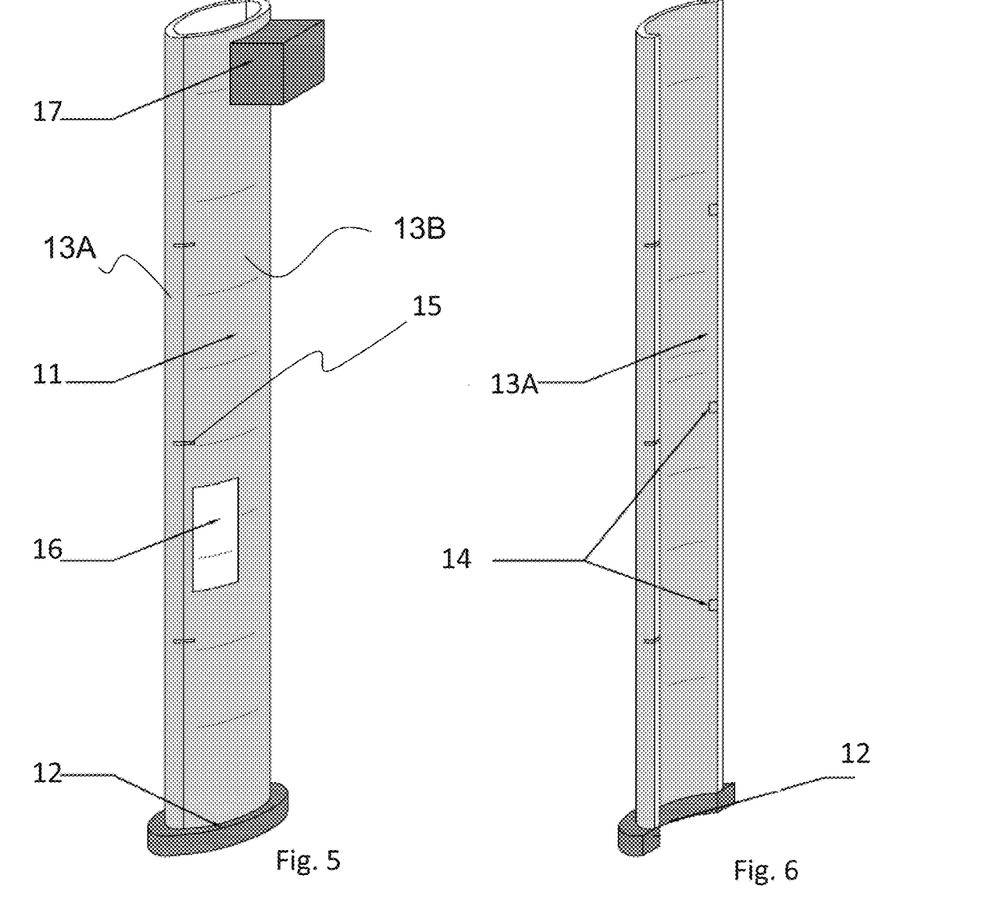
FIG. 5 is a perspective view of a support structure for the housing.
FIG. 6 is a perspective view of the support structure of FIG. 5 when open.

Referring next to FIGS. 5 and 6, the assembly includes a support structure 11 which, in use, extends upwardly from the ground and which supports the housings 1. The support structure 11 includes a steel base 12 of approximately 400 mm in diameter and made of solid stainless steel.

The support structure 11 extends upwardly from the base 12 and comprises two arcuate sections 13A, 13B which are connected along one edge by hinges 14. The structure is closed, in use, around the column using appropriate fixing means 15.

A door 16 may be formed within one or both of the sections 13A, 13B to allow access to the internal compartment for repair or replacement of wires and other connections which link the assembly to the grid. The support structure 11 is typically around 3 m in height.

The support structure 11 may include an external housing 17 for a rechargeable battery and transformer.

The battery may alternatively be housed internally.

The provision of a battery securely housed within the assembly can be used to supplement or replace main power when it would otherwise be required. The battery preferably has means to continually store sufficient energy to power the light, or device to which the assembly is retrofitted, for a sustained 48 hour period. This will ensure that the light or device is powered continually irrespective of the environmental conditions. The battery supply will, of course, be replenished during daylight hours.

If housed externally, the battery is located out of reach of public to avoid unintentional or intentional damage or theft. Any external housing is designed to complement the overall assembly.

Figure 4:
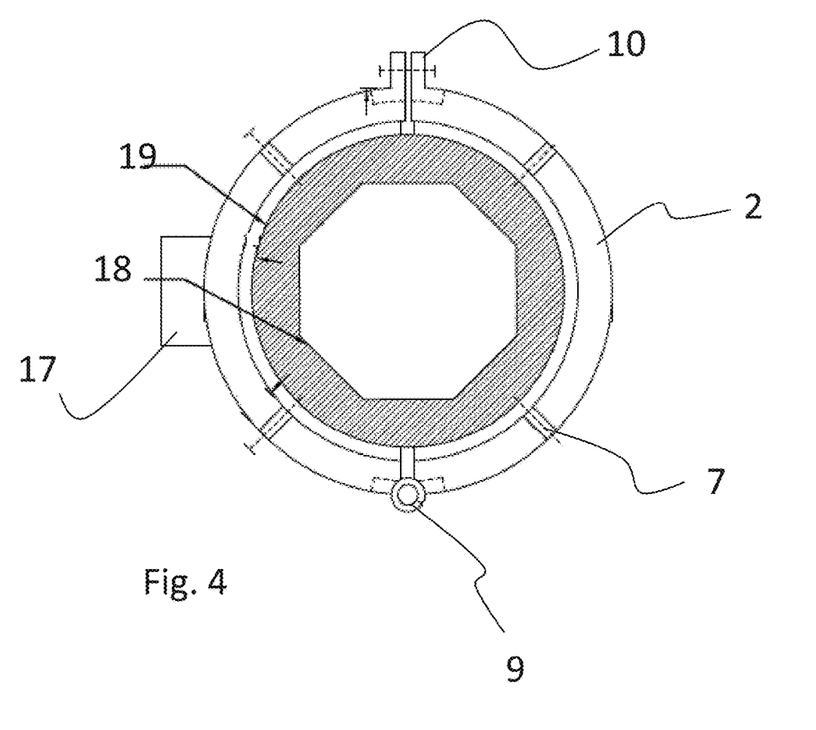
FIG. 4 is a plan view of the housing of FIGS. 1 to 3.

Referring to FIG. 4, the assembly also includes an internal insert 18 made from Neoprene or similar synthetic rubber that is shaped to profile the street light column. A further stainless steel insert 19, typically of 10 mm width is provided on the lower collar 5.

Figure 7:
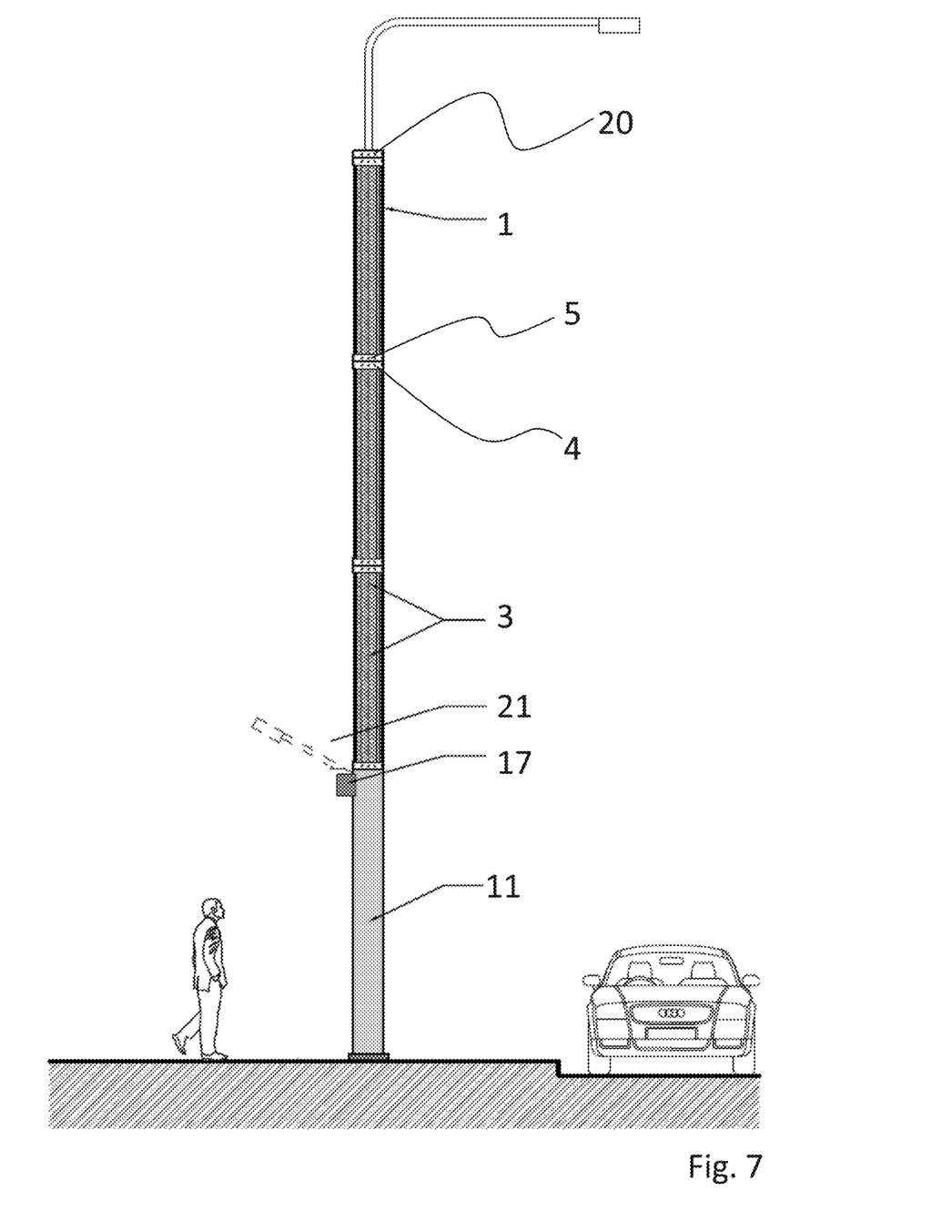
FIG. 7 is a perspective view of a photovoltaic panel assembly for a lamp post constructed in accordance with the first embodiment of the invention.
Figure 8:
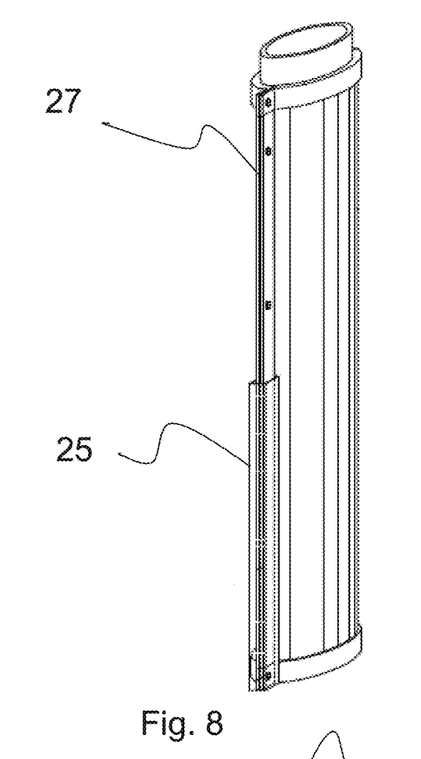
FIG. 8 is a perspective view of a photovoltaic housing constructed in accordance with a second embodiment of the invention.
Figure 9:
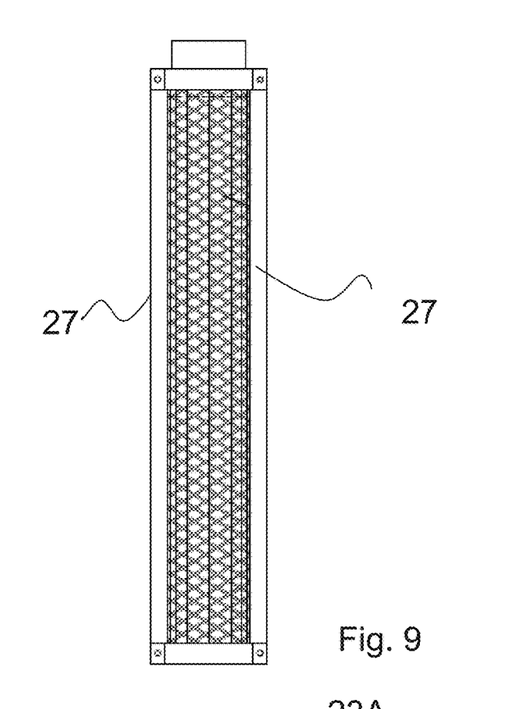
FIG. 9 is a side view of the housing of FIG. 8.

As can be seen in FIG. 7, the support structure 11 supports one or a plurality of housings 1 which are connected one above the other. The extension plate 6 of the top-most housing 1 is covered by a cap member 20. The cap member 20 has the same profile as a lower collar 5.

The modular structure of the assembly allows for easy construction around existing columns. It also allows the system to be applicable to columns of any height (extending applicability to wind turbines for example) by simply selecting the required number of housings.

FIG. 7 also shows, in dotted lines, a potential location for a pedestrian street light 21 extending outwardly from the support structure 11 at a height that is more appropriate for pedestrians.

FIGS. 8 to 19 illustrate a second embodiment of the invention. The majority of the features of this embodiment are the same so the following description will focus only on the different parts.

Figures 10, 11:
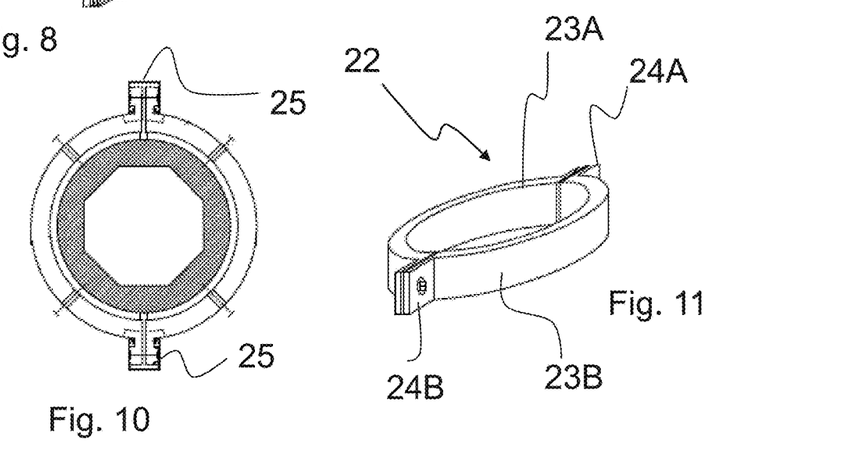
FIG. 10 is a perspective view of a collar of the housing of FIGS. 8 and 9.
FIG. 11 is a plan view of the housing of FIGS. 8 to 10.

As can be seen best in FIG. 11, the upper collar 22 of this embodiment comprises two arcuate sections 23A, 23B each end of which has an outwardly, projecting flange 24A, 24B through which a clamping bolt can extend to clamp the collar 22 around the column. Once clamped together a pressed metal profile 25 is then located over flanges 24 (see FIG. 10).

Figures 12, 13, 14:
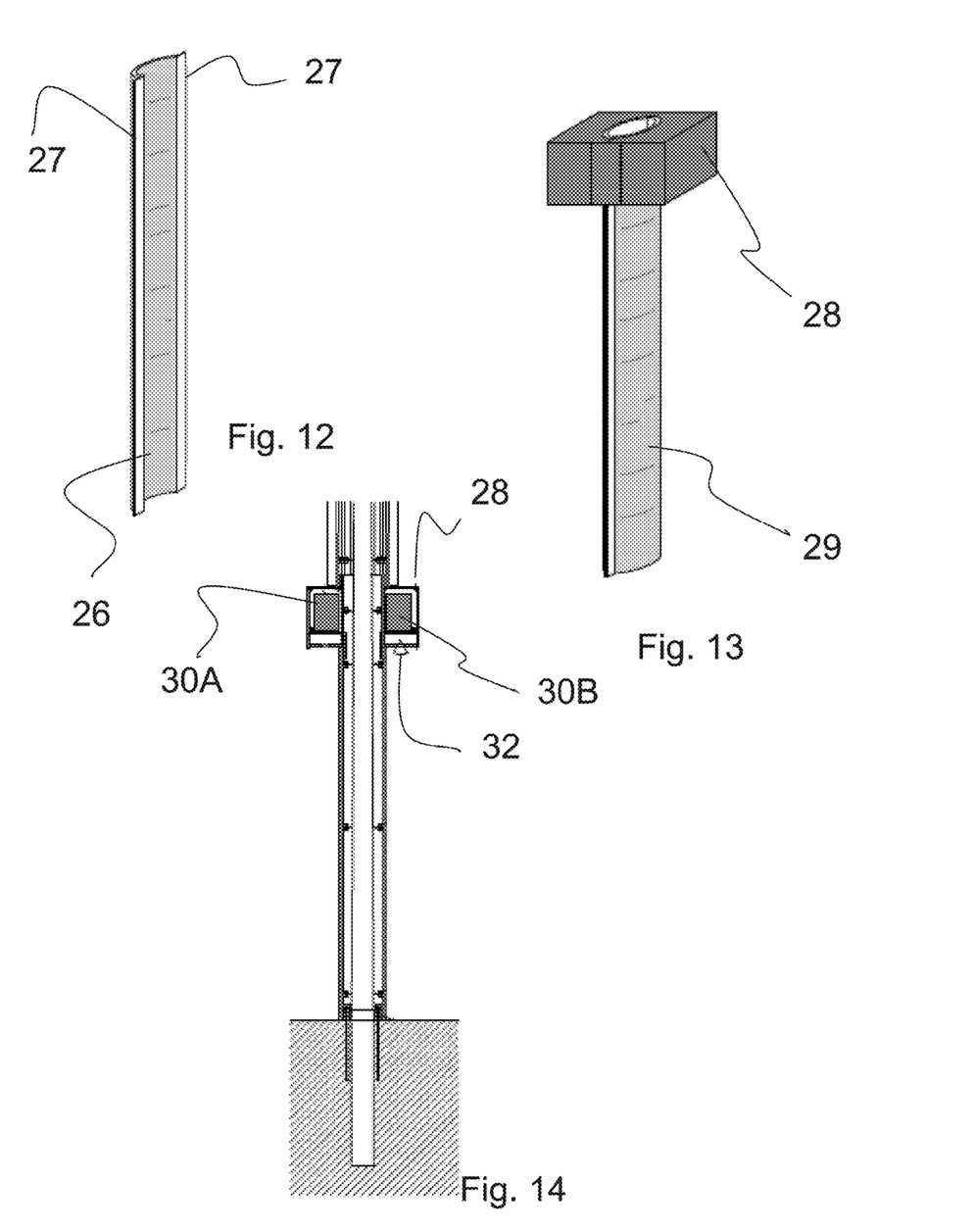
FIG. 12 is a perspective view of the photovoltaic panel of the second embodiment.
FIG. 13 is the perspective view of the support structure and battery housing.
FIG. 14 is a side cross section view of the support structure and battery housing of FIG. 13.

As can be seen in FIG. 12, the opposing edges of each photovoltaic panel 26 are formed as flanges 27 which extend outwardly from the main arcuate-shaped body so that the edges of each panel 26 can be clamped together at various locations along their length. The metal profile is elongate and extends along at least part of the photovoltaic panel flanges as well as the collar 22.

As can be seen in FIG. 13, the battery housing 28 is fitted around the column on top of the support structure 29. The battery housing 28 is made from weathered material and is generally rectangular. The column extends up through the centre of the housing 28. The housing holds a battery with transformer 30A, 30B together and an electronics module 31A, 31B on either side of the column for balance (see FIG. 16).

Figure 15:
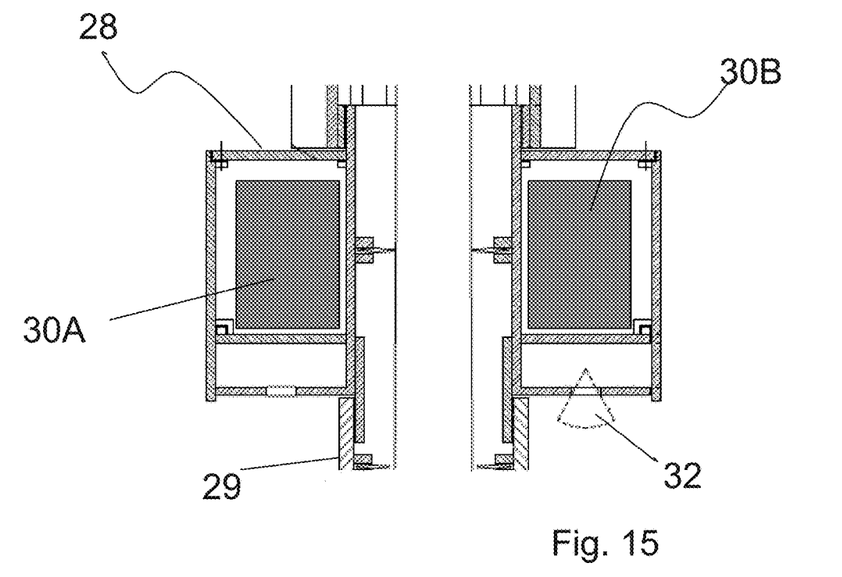
FIG. 15 is a plan view of the battery, housing of FIGS. 13 and 14.
Figure 16:
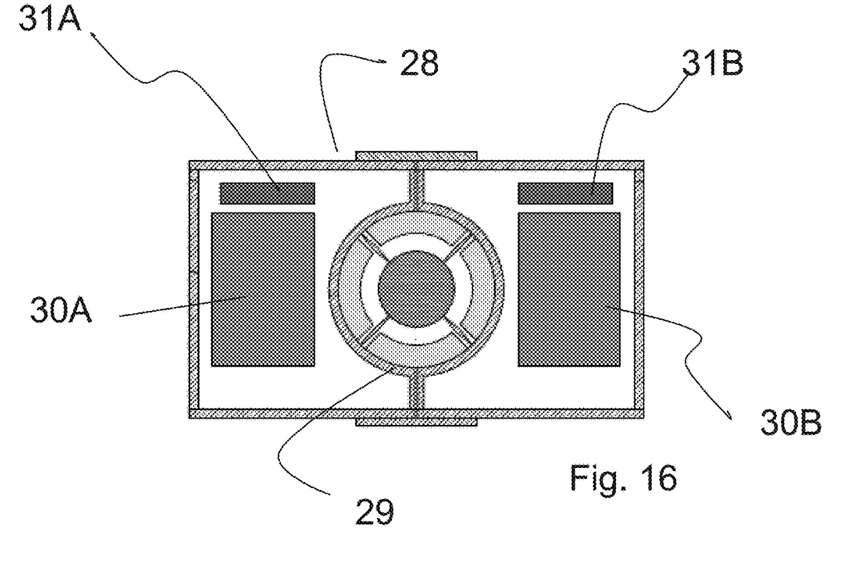
FIG. 16 is a side cross section view of the battery housing and support structure.

As can be seen in FIG. 15, the housing 28 may include other compartmental areas underneath each battery to retain other electronics, such as for example that for a pedestrian light 32 that can then be attached to the underside of the housing 28.

Figure 17:
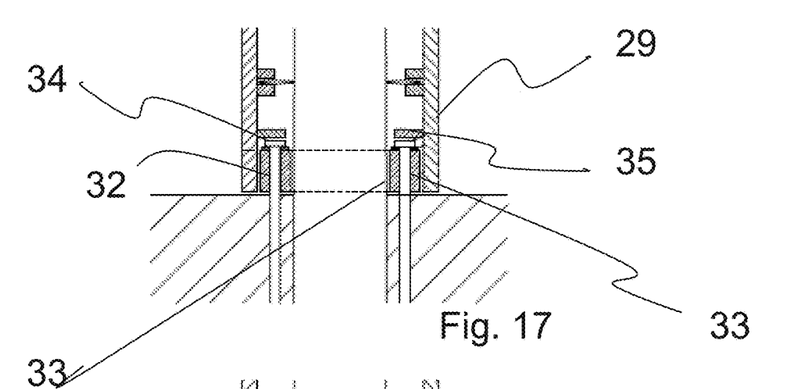
FIG. 17 is a side cross section of the base section of the apparatus.

FIG. 17 illustrates how the support structure is fixed to a concrete platform. A bolt 33 is anchored to the base of the exiting street pole or into a new concrete base if required. Steel base plates 34 are secured to either side of the bolt separate by a stainless steel washer 35. Lug plates 35 extend inwardly from the support sleeve and extend over the each bolt 33.

Figure 18:
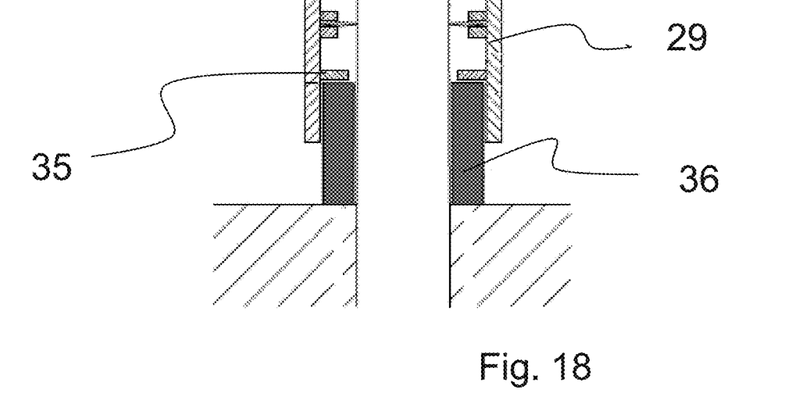
FIG. 18 is a side cross section of an alternative base section.
Figure 19:
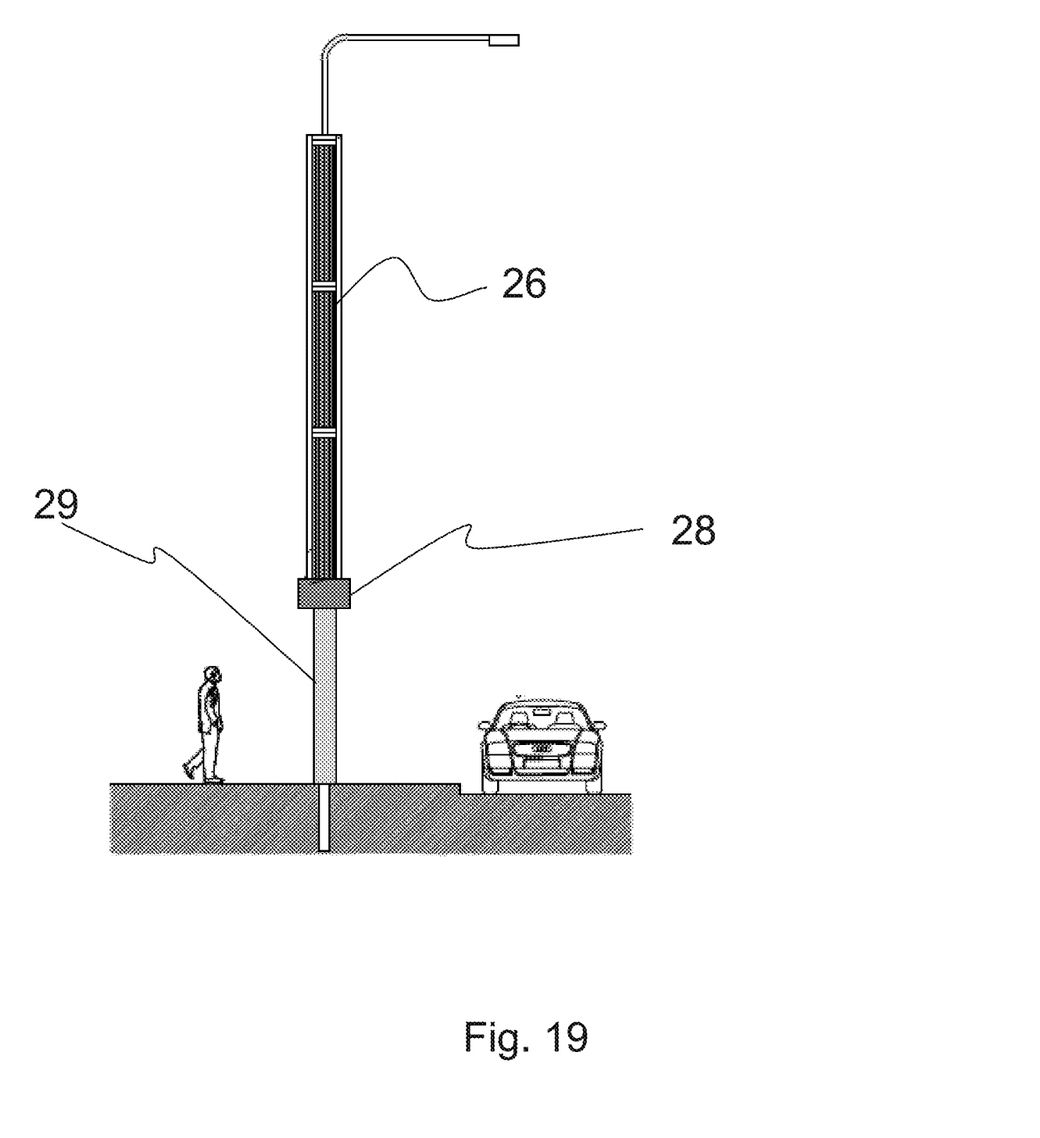
FIG. 19 is a perspective view of a photovoltaic panel assembly for a lamp post constructed in accordance with the second embodiment of the invention.

FIG. 18 illustrates an alternative fixing for the support structure to an existing platform. The support sleeve is located on recycled tire rubber blocks or rings 36 that compensate for any unevenness of the ground.

It will be understood, that the various embodiments described herein have been described by way of example only and that modifications may be made thereto without departing from the spirit and scope of the present invention as defined in the accompanying claims.

The invention claimed is:

1. A photovoltaic panel assembly for connection around a column carrying a device requiring power, the assembly comprising:
   two or more housings including first and second housings, each of the two or more housings having:
      (i) a first end and a second end with a photovoltaic panel between the first and second ends,
      (ii) first and second collars, and
      (iii) an extension section extending beyond the first end of each housing, the extension section having an external profile smaller than the inner profile of each collar and the extension section having a plurality of apertures to receive screws for securing the extension section to the column,
   wherein each collar is hinged to allow the first and second collars to be placed respectively around the first and second ends of each housing such that each extension section also extends beyond the respective first collar, and
   such that during assembly of the two or more housings that include the first and second housings, the second collar of the first housing receives and extends over the extension section at the first end of the second housing so that the second collar of the first housing protects the extension section at the first end of the second housing from exposure to the outside environment.

2. The photovoltaic panel assembly of claim 1, wherein the photovoltaic panel of each of the two or more housings is flexible.

3. The photovoltaic panel assembly of claim 1, wherein the photovoltaic panel of each of the two or more housings is made rigid in structure.

4. The photovoltaic panel assembly of claim 1, further comprising a support structure which, in use, extends upwardly from the ground and supports the two or more housings.

5. The photovoltaic panel assembly of claim 4, wherein the support structure is made from stainless steel and includes a steel base.

6. The photovoltaic panel assembly of claim 5, wherein the support structure comprises two arcuate sections connected along one edge by hinges.

7. The photovoltaic panel assembly of claim 4, wherein the support structure includes a support structure housing for a rechargeable battery.

8. The photovoltaic panel assembly of claim 4, wherein the support structure supports the two or more housings including the first and second housings, where the two or more housings are all connected one above another.

9. The photovoltaic panel assembly of claim 1, further comprising an internal insert made from synthetic rubber that is shaped to profile the column to which the assembly is retrofitted.

10. The photovoltaic panel assembly of claim 1, wherein the assembly includes a cap that fits over the extension section of a top-most one of the two or more housings.

* * * * *